June 16, 1931.  F. B. JUDY  1,810,832
ADJUSTABLE TAIL HOLDER
Filed Aug. 15, 1930
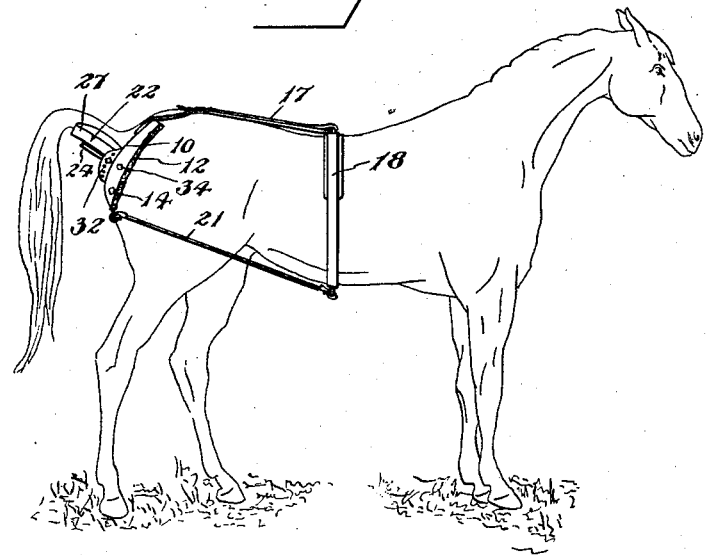
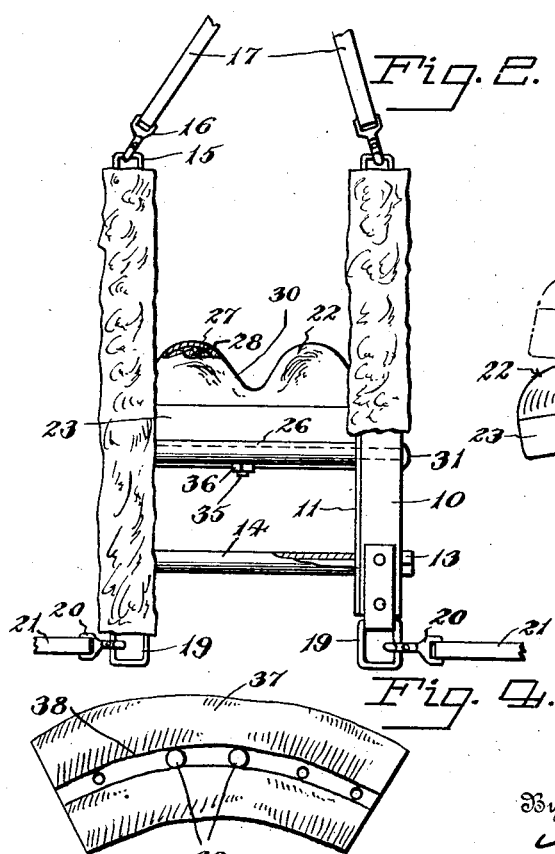
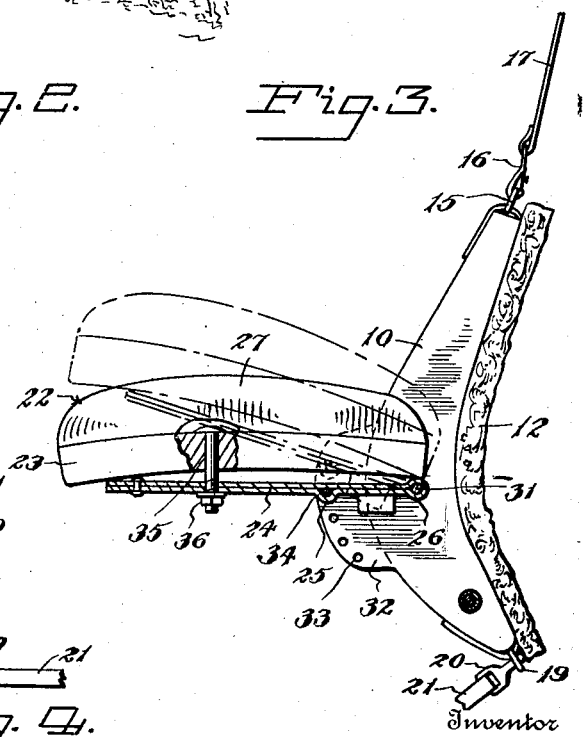
Inventor
F. B. Judy
By Lacey & Lacey
Attorneys Patented June 16, 1931

1,810,832

UNITED STATES PATENT OFFICE

FRANK B. JUDY, OF CYNTHIANA, KENTUCKY

ADJUSTABLE TAIL HOLDER

Application filed August 15, 1930. Serial No. 475,590.

This invention relates to adjustable tail holders of that general type used for lifting and straightening horses' tails.

Sometimes a horse's tail lies flat on his haunches, and sometimes the horse pulls his tail to one side. When the tail lies flat and straight in order to bring about a showy and lifted tail, an operation is necessary. The ligaments underneath the tail are cut and then a tail holder is placed on the horse, adjusted to the animal, and a pad carried by the tail holder supports the tail raised to the desired point. This stretches the tail at the point of operation and holds it there until the ends of the ligaments which have been cut grow back together. For this single operation about thirty days are required for the ligaments to heal. The tail holders hitherto used are rigid, and the tail when operated on and placed in the crupper, remains in that one position for the whole period of thirty days until cured. Sometimes the tail in this rigid position becomes inflamed, oftentimes paralyzed, and sometimes becomes sore and rots off. The present invention provides an adjustable pad for the tail holder which permits of various angular inclinations of the pad relatively to the tail holder, to prevent such inflammation, paralysis and rotting and provide greater comfort to the animal while going through this period of healing.

When a horse has a flat and crooked tail, that is, a tail which hangs to one side, in order to make a showy tail, two operations are necessary, one to cut the ligaments beneath the tail, and the other to cut the ligaments on the side of the tail which draw it to one side. Using the ordinary tail holder, it has hitherto been necessary to make one operation and wait thirty days or more until it heals, and then make the other operation and wait an additional thirty days or more until it also heals. The present invention provides a curved pad for application to the adjustable support of the tail holder which permits of straightening and lifting the tail simultaneously in a single thirty-day period of time.

To accomplish the above and other objects the invention consists of certain novel details of construction and combinations of parts hereinafter fully described and claimed, it being understood that various modifications may be resorted to within the scope of the appended claims without departing from the spirit or sacrificing any of the advantages of the invention.

In the accompanying drawings forming part of this specification,

Figure 1 is a side elevation of my improved tail holder in applied position,

Fig. 2 is an underneath plan view of the improved tail holder.

Fig. 3 is a longitudinal sectional view through the tail holder showing the adjustable pad dotted in raised position, and Fig. 4 is a plan view of the curved tail supporting pad.

Referring now to the drawings in which like characters of reference designate similar parts in the various views, the tail holder is shown to comprise a pair of side frames 10 preferably formed of wood and faced on the inner sides with metal plates 11. The side frames are curved in outline to conform to the curvature of the animal's buttocks and the inner faces of the frames are padded as shown at 12 so as to fit the animal comfortably during the healing period. The side frames are rigidly held parallel by means of a bolt 13 passes through the frames. A spacing sleeve 14 is fitted on the bolt and bears against the metal face plates 11 to maintain the proper space between the side frames.

The side frames are equipped at the top with metal eyes 15 which receive snap hooks 16 carried by straps 17 that extend forwardly on the animal's back and are secured in any preferred manner to a girth 18. Likewise, the side frames are equipped at the bottom with metal eyes 19 which receive snap hooks 20 carried by straps 21 that extend over the animal's hips and are secured in any preferred manner at the forward ends to the girth 18.

Pivoted between the side frames is a pad, designated in general by the numeral 22. The pad comprises a base 23 which is equipped at the bottom with a metal base plate 24 having a pair of spaced transverse eyes 25 and 26, as best shown in Fig. 3. The top face of the base 23 is padded preferably by means of a canvas or similar strip 27 beneath which hair 28 or other padding material is inserted to bow up the canvas covering on each side of the center line thereof to produce a substantially V-shaped groove 30 which extends longitudinally of the pad. The V-shaped construction of the groove permits of ventilation beneath the horse's tail when the latter is supported in the groove so that a healthy, comfortable condition is maintained during the healing period.

By now referring to Fig. 3, it will be seen that a hinge bolt 31 is passed through the hinge eye 26 at the inner end of the pad. Also, the side frames 10 of the pad are equipped with outstanding ears 32 which are provided with a curved line of openings 33, the radius of curvature of which is struck from the center of the hinge bolt 31. A bolt 34 is passed through the eye 25 of the base 24 of the adjustable pad and is selectively engaged in any pair of the openings 33 of the side frames to maintain the pad at any angular position desired whereby the tail may be held raised to any desired extent during the healing period.

For securing the adjustable pad to the base plate, a bolt 35 is passed through the base 23 of the adjustable pad at substantially the bottom of the groove 30 and is passed through the base plate 24. A nut 36 is screwed onto the end of the bolt and bears against the bottom of the base plate to rigidly secure the adjustable pad and base plate together as a unit. Removal of the bolt obviously permits of removal of the pad having the straight groove 30 therein and the substitution therefore of a pad having a curved groove therein which will now be described.

By referring to Figure 4, it will be seen that the adjustable pad 37 is curved in longitudinal outline and is provided centrally with a longitudinal curved groove 38. A pair of openings 39 are formed in the groove 38 to selectively receive the above described bolt 35 whereby the adjustable pad 37 may be positioned on the base plate 24 with the curvature of the groove extending in the proper direction to straighten a curved tail.

It will be observed that the structure of the frames of the tail holder presents a skeleton frame which is thoroughly ventilated to maintain the device in a sanitary condition as well as to promote the comfort of the animal after the operation and during the healing period. It will further be observed that by virtue of the above described adjustable means including the perforated ears 32 and the bolt 35 carried by the base plate 24 an extremely secure adjustment will be maintained at any angular position of the pad 22 or the pad 37 so that dislodgment of the pad when once applied, due to movements of the animal, is positively prevented, which is not the case where set screws and the like are employed in connection with rotary pivots to accomplish this purpose.

From the above description it is thought that the construction and operation of my invention will be clearly understood without further explanation.

Having thus described the invention, I claim:

1. An adjustable tail holder comprising side frames rigidly held spaced apart, said side frames having integral ears, each ear being provided with a row of perforations, a tail supporting pad pivoted at one end to said side frames, and a pin carried by said pad remote from the pivot of the pad and selectively receivable in the perforations of said ears to maintain the pad at any desired angular inclination relatively to said side frames.

2. An adjustable tail holder comprising side frames, pads carried by the side frames, a tail supporting pad provided with a laterally curved tail receiving groove, a base plate pivoted at one end between said side frames, means for securing said pad to said base plate, and means spaced from the pivot of the base plate for adjustably securing said base plate to said side frames at any desired angular position relatively to said side frames.

3. An adjustable tail holder comprising side frames, a bolt securing said side frames in spaced relation, a spacing sleeve on said bolt for maintaining a predetermined distance between said side frames, a base plate pivoted at one end between said side frames, a tail receiving pad secured to said base plate, said base plate having an eye disposed near said pivot, said side frames being provided with outstanding ears each having a curved series of openings concentric with said pivot, and an adjusting pin passed through said eye and passed selectively through a pair of said openings to adjustably secure said pad at any desired angular inclination relatively to said side frames.

4. An adjustable tail holder comprising side frames, a base plate pivoted at one end between said side frames, a tail supporting pad having a longitudinal groove therein, means removably securing said pad to said base plate, and means disposed between said securing means and the pivot of said base plate for adjustably securing said base plate to extend at any desired angular position relatively to said side frames.

5. An adjustable tail holder comprising curved side frames padded at the inner edges to engage the buttocks of an animal, a base plate pivoted at one end between said side frames, means securing the base plate adjustably to extend at any desired angular inclination to said side frames, and a tail supporting pad removably secured to said base plate and having a curved longitudinal groove therein for straightening a crooked tail, adjustment of said base plate permitting of said pad being elevated to lift the tail simultaneously with the straightening thereof.

In testimony whereof I affix my signature.

FRANK B. JUDY. [L. S.]